(12) United States Patent
Oriakhi

(10) Patent No.: US 7,850,774 B2
(45) Date of Patent: Dec. 14, 2010

(54) INK FOR INKJET APPLICATIONS

(75) Inventor: Christopher O. Oriakhi, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 538 days.

(21) Appl. No.: 11/565,318

(22) Filed: Nov. 30, 2006

(65) Prior Publication Data

US 2008/0131614 A1 Jun. 5, 2008

(51) Int. Cl.
*C09D 11/00* (2006.01)
*G01D 11/00* (2006.01)

(52) U.S. Cl. .................... 106/31.65; 347/100

(58) Field of Classification Search ............. 106/31.65; 347/100
See application file for complete search history.

(56) References Cited

U.S. PATENT DOCUMENTS

| 4,680,058 A | 7/1987 | Shimizu et al. |
| 6,989,054 B2 | 1/2006 | Tanabe et al. |
| 2002/0149656 A1* | 10/2002 | Nohr et al. .................. 347/95 |
| 2003/0052952 A1 | 3/2003 | Tanabe et al. |
| 2003/0116747 A1 | 6/2003 | Lem et al. |
| 2004/0246319 A1 | 12/2004 | Ito et al. |
| 2005/0020728 A1 | 1/2005 | Nagaswa et al. |
| 2005/0282928 A1 | 12/2005 | Lin et al. |
| 2005/0282946 A1 | 12/2005 | Lin et al. |
| 2006/0148932 A1* | 7/2006 | Nohr et al. .................. 523/201 |

FOREIGN PATENT DOCUMENTS

| EP | 1403089 B1 | 8/2006 |
| JP | 2006-037080 A | 2/2006 |

* cited by examiner

*Primary Examiner*—Jerry Lorengo
*Assistant Examiner*—Veronica Faison Gee

(57) ABSTRACT

An inkjet ink, comprises an ink vehicle and a white pigment dispersed in the vehicle, wherein the pigment comprises particles in which at least 5% of the particles have an average size greater than 100 nm and at least 25% of the particles have an average size less than 50 nm.

17 Claims, No Drawings

INK FOR INKJET APPLICATIONS

BACKGROUND

Inkjet printing is relatively inexpensive and is used in many different applications. In inkjet printing, droplets of ink are ejected from a printhead in response to electrical signals generated by a microprocessor and are deposited on a print medium, such as paper or polymeric substrates, to form the desired image.

When the print medium has a white recording surface, it is possible to print easily legible characters, signs and images in various colors. When it is desired to print on a print medium that has a recording surface that is other than white, however, or on a recording medium that is transparent or semitransparent, it may be desirable to print with white ink. By way of example only, white ink may be used in conjunction with inkjet printing to indicate positions for part mounting on printed circuit boards.

White ink formulations typically include a particulate white pigment dispersed in a solvent. One common white pigment is titanium dioxide, $TiO_2$, also known as titanium (IV) oxide or titania. When used as a pigment, it is sometimes called "titanium white," "Pigment White 6," or "CI 77891." Titanium dioxide is widely used as a white pigment because of its brightness and very high refractive index. Other white pigments include zinc oxide, and salts or esters of titanic acid.

White inks based on these compounds tend to have less-than-satisfactory characteristics, however. In order to provide optimal optical effect, the white pigments are provided as particles having an average size of at least about 1 μm, and sometimes larger. However, because the compounds are relatively dense, particles this large tend to settle and agglomerate. This is particularly disadvantages in inkjet applications, where the ink is stationary for long periods and where the printhead requires smooth-flowing, homogeneous ink. If an ink does not function properly in the printhead, image quality is reduced.

Likewise, other pigments that are typically provided as particles may suffer from similar settling and agglomeration traits. Thus, pigments that are sufficiently stable for use in other applications may be insufficiently stable for use in inkjet applications.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "comprising, but not limited to . . . ."

The term "peak" as used herein with respect to a plot of values refers to a point at which the first derivative of the plot is zero and the second derivative of the plot is negative.

"Particle size," as used herein, refers to the approximate diameter of a generally spherical pigment particle, or to the approximate longest characteristic dimension of a non-spherical particle. "Average size" refers to the approximate mean diameter, or the mean longest characteristic dimension, of a plurality of pigment particles.

DETAILED DESCRIPTION

Aqueous ink compositions that include a particulate pigment are described herein, along with their method of making and method of use. In certain embodiments, the ink may be an aqueous white ink. The inks use particular combinations of particle sizes to enhance stability both during storage and during use. As a result, the ink formulations provide improved properties such as hiding, coverage, and clarity when applied to surfaces.

According to some embodiments, stable ink compositions comprise a particulate pigment dispersed in a carrier. The carrier may be water. The inks may also include a humectant, stabilizer, surfactant rheology modifier, co-solvent, and/or biocide. Further, the inks may include a water soluble polymer or copolymer and/or a pH modifier.

Pigment

Inks containing pigment particles larger than about 50 nm tend to settle or agglomerate when present in a dispersion, even in the presence of customary stabilizers. It has been found that stability of such inks is enhanced by the inclusion of a fraction of very fine particles, i.e., particles having average sizes less than about 50 nm, which helps maintain large particles in suspension, and in some cases can thereby eliminate or reduce the amount of stabilizing agents needed. More particularly, in certain embodiments, at least about 5% of the particles have an average size greater than about 100 nm, while at least about 25% of the particles have an average size less than about 50 nm. In some embodiments, 10% of the particles may have an average size greater than 100 nm and at least 50% of the particles may have an average size less than 50 nm.

In certain embodiments, the particles have a size distribution characterized by two peaks. For example, the particle size distribution may include one peak at or below about 50 nm and may include a second peak above about 50 nm. In some embodiments, the particle size distribution may include one peak at or below 50 nm and a second peak above 100 nm.

The pigment can be any suitable pigment material. In certain embodiments, the pigment is selected from the group consisting of titanium oxide, zinc oxide, salts and esters of titanic acid, and combinations thereof. Still further, the pigment may comprise other colorants, including but not limited to titanates and niobates, layered double hydroxides such as Mg—Al—$CO_3$-LDH, Li—Al—Cl-LDH, and Zn—Al—$CO_3$-LDH, inorganic phosphates, phosphonates, and combinations thereof.

Titanium Dioxide Pigment

When titanium dioxide ($TiO_2$) pigment is employed in a new ink composition, it is in the rutile or anatase crystalline form in some embodiments. The total amount of titanium dioxide present in the ink composition is, in certain exemplary formulations, from about 3 wt % to about 6 wt %, with the sub-50 nm particles comprising about 5 to 25% wt percent of the total ink composition.

In some embodiments, the pigment in the inks comprises substantially pure titanium dioxide or may include other metal oxides, such as zinc oxide. If additional pigments are present, in certain embodiments they are present in an amount from about 5 wt % to about 15 wt %, with average particle sizes between about 5 and 50 nm and more particularly about 10 nm.

Liquid Carrier

The pigment(s) of the ink composition(s) is/are, in some embodiments, dispersed in a carrier or vehicle that comprises water or a mixture of water and a water-miscible co-solvent. In alternative embodiments, the carrier comprises one or more glycol ether or aqueous mixtures thereof.

Optional Additives

In some embodiments, the inks optionally include a humectant. The humectant may have a higher boiling point than the liquid carrier and may be added to prevent drying and retard settling during storage. Examples of suitable humectants include polyhydric alcohols such as ethylene glycol, diethylene glycol, propylene glycol, butylene glycol, triethylene glycol, 1,5-pentanediol and 1,2,6-hexanetriol; glycol ethers such as dipropylene glycol monomethyl ether and propylene glycol normal propyl ether; and others including trimethylolpropane, trimethylolethane, glycerin, polyethylene glycol and dipropylene glycol. In an exemplary formulation, the humectant employed in the ink formulation is propylene glycol.

In some embodiments, the inks also include a rheology modifier. Suitable rheology modifiers can be any known commercially available rheology modifiers, such as Bentone® EW and Rheolate-2001®, both from Elementis Specialties Inc., acrylic polymers, derivitized cellulosic materials, alginates, organoclay.

The inkjet ink may include a pigment stabilizer or dispersant such as a polymeric dispersant, for example. In addition to, or in place of a polymeric dispersant, one or more surfactant compounds may be used as dispersants. These may be anionic, cationic, non-ionic, or amphoteric. A detailed list of non-polymeric as well as some polymer dispersants are listed in the section on dispersants, pages 110-129, 1990 McCutcheon's Functional Materials, North American Edition, Manufacturing Confectioner Publishing Co., Glen Rock, N.J. 07452. Suitable polymeric dispersants are further recited in U.S. Pat. No. 5,946,012, which is hereby incorporated herein by reference. Alternatively, or in addition, some or all of the pigment particles, and in particular the larger pigment particles, may include a surface modification that renders them self-dispersing. Such pigments can be surface modified in a variety of ways including, but not limited to, treatment with alkali salts of hypochlorite, ozone, silating agents, and diazonium salts of aromatic sulfonic acid additions.

In some embodiments, the inks also include a surfactant to further enhance stability. Suitable surfactants include, but are not limited to, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. Still further, suitable surfactants include Surfactants suitably employed in the practice of the invention include anionic and nonionic surfactants. Examples of anionic surfactants include: Sulfonate surfactants such as Sulfosuccinates (Aerosol OT, A196; AY and GP, available from CYTEC) and Sulfonates (Aerosol DPOS-45, OS available from CYTEC; Witconate C-50H available from WITCO; Dowfax 8390 available from DOW); and Fluoro surfactants (Fluorad FC99C available from 3M). Examples of nonionic surfactants include: Fluoro surfactants (Fluorad FC170C available from 3M); Alkoxylate surfactants (Tergitol series 15S-5, 15S-7, and 15S-9 available from Union Carbide); Sulfyinol series; and Organosilicone surfactants (Silwet L-77 and L-76-9 available from WITCO). The amount of surfactant in the ink is usually 0.1% to 6% by weight.

Other Ingredients

In addition to the foregoing, the inks, in some embodiments, optionally contain one or more other ingredients, including but not limited to: polymers, corrosion inhibitors, pH adjusting agents, and biocides (anti-microbial agents, anti-fungal agents, etc.), binders, sequestering agents, buffering agents, light stabilizers, anti-curl agents, thickeners, optical brighteners, nanoparticle stabilizers, and/or other additives, depending on the desired properties of the inkjet ink.

The inks use a specific distribution of particle sizes to help stabilize and keep the pigments deflocculated over long periods of time both in slurry form and when the slurry is subsequently used in an ink formulation. As a result, the ink formulation is stable and has advantageous properties when applied to a printable surface. In particular, it has been discovered that the new ink compositions are sufficiently stable to be well-suited for use a inkjet inks.

In certain embodiments, an ink formulation containing a white pigment for use in inkjet applications is free of many of the undesirable characteristics of previously known inks. In certain embodiments, white pigments are employed which can be sufficiently stabilized in inkjet compatible formulations so that the resultant ink can be effectively jetted, even after being stored or otherwise unused for some period of time.

EXAMPLES

Examples of dispersions used in formulation the new ink compositions are set forth below. These Examples are merely illustrative and are not intended to limit the claims in any way.

| Exemplary Dispersion Compositions (wt. %) | | | | |
|---|---|---|---|---|
| | Sample ID | | | |
| | A | B | C | D |
| TiO$_2$ | 52 | 52 | 52 | 0 |
| ZnO | 0 | 0 | 0 | 54 |
| Water | 39.5 | 39.5 | 39.5 | 37.5 |
| Rhodosil Antifoam 426R | 0.5 | 0.5 | 0.5 | 0.5 |
| Poly(vinyl pyrrolidone) (PVP) | 5.0 | 0 | 0 | 0 |
| Surfynol 440 or 465 | 1.0 | 1.0 | 1.0 | 1.0 |
| Propylene glycol or glycerine | 2.0 | 2.0 | 2.0 | 2.0 |
| SMA copolymer | 0 | 5.0 | 0 | 5.0 |
| Poly(vinyl pyrrolidone-co-acrylic acid) | 0 | 0 | 5.0 | 0 |
| Total | 100 | 100 | 100 | 100 |

Examples of inks formulated using the above-described pigment dispersions are as follows:

| Component | Wt % | Range |
|---|---|---|
| Example I | | |
| TiO$_2$—A (<100 nm) | 2.5 | 0.5-12 |
| TiO$_2$—B (>100 nm) | 0.5 | 0-10 |
| Poly(ethylene oxide) | 1 | 0.1-6 |
| Isopropyl alcohol | 4 | 1.0-8 |
| Triethylene Glycol Monomethyl Ether | 5 | 2.0-12 |
| Water | 87 | 30-90 |
| Example II | | |
| TiO$_2$—A (<100 nm) | 2.5 | 0.5-12 |
| TiO$_2$—B (>100 nm) | 0.5 | 0-10 |
| Poly(vinyl pyrrolidone) | 1 | 0.1-6 |
| Isopropyl alcohol | 4 | 1.0-8 |
| Triethylene Glycol Monomethyl Ether | 5 | 2.0-12 |
| Water | 87 | 30-90 |

-continued

| Component | Wt % | Range |
|---|---|---|
| Example III | | |
| TiO$_2$—A (<100 nm) | 2.5 | 0.5-12 |
| TiO$_2$—B (>100 nm) | 0.5 | 0-10 |
| Poly(Ethylene Glycol) | 1 | 0.1-6 |
| Isopropyl alcohol | 4 | 1.0-8 |
| Triethylene Glycol Monomethyl Ether | 5 | 2.0-12 |
| Water | 87 | 30-90 |
| Example IV | | |
| TiO$_2$—A (<100 nm) | 2.5 | 0.5-12 |
| TiO$_2$—B (>100 nm) | 0.5 | 0-10 |
| Polyacrylic acid, Sodium salt | 1 | 0.1-6 |
| Isopropyl alcohol | 4 | 1.0-8 |
| Triethylene Glycol Monomethyl Ether | 5 | 2.0-12 |
| Water | 87 | 30-90 |

The formulations of Examples I-IV were homogenized overnight on a roller and filtered through a 0.2 micron filter. The resulting inks were characterized, filled into a selected TIJ pen and printed. The platforms used were HP DJ 970cxi, and DJ 5550. The inks were printed on HP inkjet transparency and other commercially available colored media. Printed texts and graphics had good print quality. The inks flowed well and exhibited good stability, opaqueness and/or whiteness. Dispersions A, C, and D exhibited negligible settling after three months.

Ink Sets

The inks can be used in ink sets along with one or more other inks. The non-white inks of the ink set contain other colorants, which may include other pigment colorants, such as are known in the art, including but not limited to cyan inks, magenta inks, and yellow inks. The other inks in the ink set can be aqueous or non-aqueous. The choice between the two systems is dictated by the particular requirements for matching the ink system to the printed substrate. For example, for printing on a paper or textile substrate, an aqueous systems is selected in some embodiments. However, in other embodiments in which a plastic substrate is selected, a non-aqueous vehicles is selected instead. Selection of other aqueous inks for the ink set can readily be made based upon the desired end use and compatibility with the selected ink composition.

The above discussion is meant to be illustrative of the principles and various embodiments of the present invention. Numerous variations and modifications will become apparent to those skilled in the art once the above disclosure is fully appreciated. For example, the pigments, carriers and other additives and ingredients may each be varied from those identified herein, provided that the disclosed particle size distribution is maintained to ensure stability of the ink for use as an inkjet ink. It is intended that the following claims be interpreted to embrace all such variations and modifications.

What is claimed is:

1. An inkjet ink, comprising:
   an ink vehicle; and
   a white pigment dispersed in the vehicle, wherein the pigment consists of particles less than 200 nm in diameter or longest characteristic dimension having a size distribution characterized by two peaks, in which at least 5 wt % of the particles have a mean average size greater than or equal to 100 nm and less than 200 nm, and at least 25 wt % of the particles have a mean average size less than or equal to 50 nm, said ink having enhanced stability and resistance to flocculation.

2. The inkjet ink of claim 1 wherein at least 10 wt % of the particles have an average size greater than 100 nm and at least 50 wt % of the particles have an average size less than 50 nm.

3. The inkjet ink of claim 1 wherein the white pigment is selected from the group consisting of titanium oxide, zinc oxide, salts and esters of titanic acid, and combinations thereof.

4. The inkjet ink of claim 1 wherein the size distribution of the white pigment includes one said peak at or below 50 nm.

5. The inkjet ink of claim 1 wherein the size distribution of the white pigment includes one said peak at or below 50 nm and a second said peak above 50 nm.

6. The inkjet ink of claim 1 wherein the size distribution of the white pigment includes one said peak at or below 50 nm and a second said peak above 100 nm.

7. The inkjet ink of claim 1 further comprising a stabilizer other than said particles of average size less than 50 nm.

8. A method of inkjet printing a white image on a print medium, comprising:
   utilizing an inkjet printer to apply to the print medium an amount of an ink comprising an ink vehicle and a white pigment dispersed in the vehicle, wherein the pigment consists of particles less than 200 nm in diameter or longest characteristic dimension having a size distribution characterized by two peaks, in which at least 5 wt % of the particles have a mean average size greater than 100 nm and less than 200 nm, and at least 25 wt % of the particles have a mean average size less than 50 nm, said ink having enhanced stability and resistance to flocculation.

9. The method of claim 8 wherein at least 10 wt % of the particles have an average size greater than 100 nm and at least 50 wt % of the particles have an average size less than 50 nm.

10. The method of claim 8 wherein the particle size distribution of the white pigment includes one said peak at or below 50 nm.

11. The method of claim 8 wherein the particle size distribution of the white pigment includes one said peak at or below 50 nm and a second said peak above 50 nm.

12. The method of claim 8 wherein the size distribution of the white pigment includes one said peak at or below 50 nm and a second said peak above 100 nm.

13. The method of claim 8 wherein the white pigment is selected from the group consisting of titanium oxide, zinc oxide, salts and esters of titanic acid, and combinations thereof.

14. An inkjet printer, comprising: a first inkjet pen including a white ink comprising an ink vehicle and a white pigment dispersed in the vehicle, wherein the pigment consists of particles less than 200 nm in diameter or longest characteristic dimension having a size distribution characterized by two peaks, in which at least 5 wt % of the particles have a mean average size greater than 100 nm and less than 200 nm, and at least 25 wt % of the particles have a mean average size less than 50 nm, said ink having enhanced stability and resistance to flocculation.

15. The inkjet printer of claim 14 wherein at least 10 wt % of the particles have an average size greater than 100 nm and at least 50 wt % of the particles have an average size less than 50 nm.

16. The inkjet printer of claim 14 wherein the particle size distribution of the white pigment includes one said peak at or below 50 nm.

17. The inkjet printer of claim 14 wherein the particle size distribution of the white pigment includes one said peak at or below 50 nm and a second said peak above 50 nm.

* * * * *